(12) United States Patent
Kim

(10) Patent No.: US 10,394,084 B2
(45) Date of Patent: Aug. 27, 2019

(54) LIQUID CRYSTAL DISPLAY AND METHOD OF MANUFACTURING THE SAME

(71) Applicant: Samsung Display Co. Ltd., Yongin, Gyeonggi-do (KR)

(72) Inventor: Tae Hoon Kim, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 589 days.

(21) Appl. No.: 15/055,123

(22) Filed: Feb. 26, 2016

(65) Prior Publication Data

US 2017/0090250 A1 Mar. 30, 2017

(30) Foreign Application Priority Data

Sep. 25, 2015 (KR) ........................ 10-2015-0136694

(51) Int. Cl.
*G02F 1/1337* (2006.01)

(52) U.S. Cl.
CPC ...... *G02F 1/133788* (2013.01); *G02F 1/1337* (2013.01); *G02F 2001/133742* (2013.01); *G02F 2001/133773* (2013.01); *G02F 2001/133776* (2013.01); *Y10T 428/1005* (2015.01)

(58) Field of Classification Search
CPC ............. G02F 1/1337; G02F 1/133788; G02F 1/13392; G02F 2001/133742; G02F 2001/133773; G02F 2001/13396; Y10T 428/1005
See application file for complete search history.

(56) References Cited

U.S. PATENT DOCUMENTS

| | | | | |
|---|---|---|---|---|
| 2008/0013292 | A1* | 1/2008 | Slikkerveer | G06F 1/1601 361/749 |
| 2011/0199566 | A1* | 8/2011 | Mazusaki | C08G 73/1039 349/123 |
| 2012/0062826 | A1* | 3/2012 | Tanaka | G02F 1/133719 349/123 |

(Continued)

FOREIGN PATENT DOCUMENTS

| JP | 201258562 | 3/2012 |
|---|---|---|
| KR | 20020071724 | 9/2002 |

(Continued)

*Primary Examiner* — Sophie Hon
(74) *Attorney, Agent, or Firm* — Cantor Colburn LLP

(57) ABSTRACT

A liquid crystal display (LCD) includes a thin-film transistor (TFT) array substrate, a counter substrate facing the TFT array substrate, a liquid crystal layer disposed between the TFT array substrate and the counter substrate, a first liquid crystal alignment base layer disposed between the liquid crystal layer and the counter substrate and including a first compound, a first liquid crystal alignment stabilization layer including protrusions including first polymers of reactive mesogens disposed on a surface of the first liquid crystal alignment base layer, a second liquid crystal alignment base layer disposed between the liquid crystal layer and the TFT array substrate and including a second compound different from the first compound, and a second liquid crystal alignment stabilization layer including second protrusions including second polymers of the reactive mesogens disposed on a surface of the second liquid crystal alignment base layer.

15 Claims, 16 Drawing Sheets

(56) References Cited

U.S. PATENT DOCUMENTS

| | | | |
|---|---|---|---|
| 2012/0218500 A1* | 8/2012 | Nakamura | G02F 1/133711 |
| | | | 349/128 |
| 2016/0209707 A1 | 7/2016 | Suh | |
| 2017/0059941 A1 | 3/2017 | Lee et al. | |
| 2017/0090250 A1 | 3/2017 | Kim | |

FOREIGN PATENT DOCUMENTS

| KR | 20070021145 | 2/2007 |
|---|---|---|
| KR | 1020120089080 | 8/2012 |
| KR | 1020150012093 | 2/2015 |
| KR | 1020150040616 | 4/2015 |
| KR | 1020160090451 | 8/2016 |

* cited by examiner

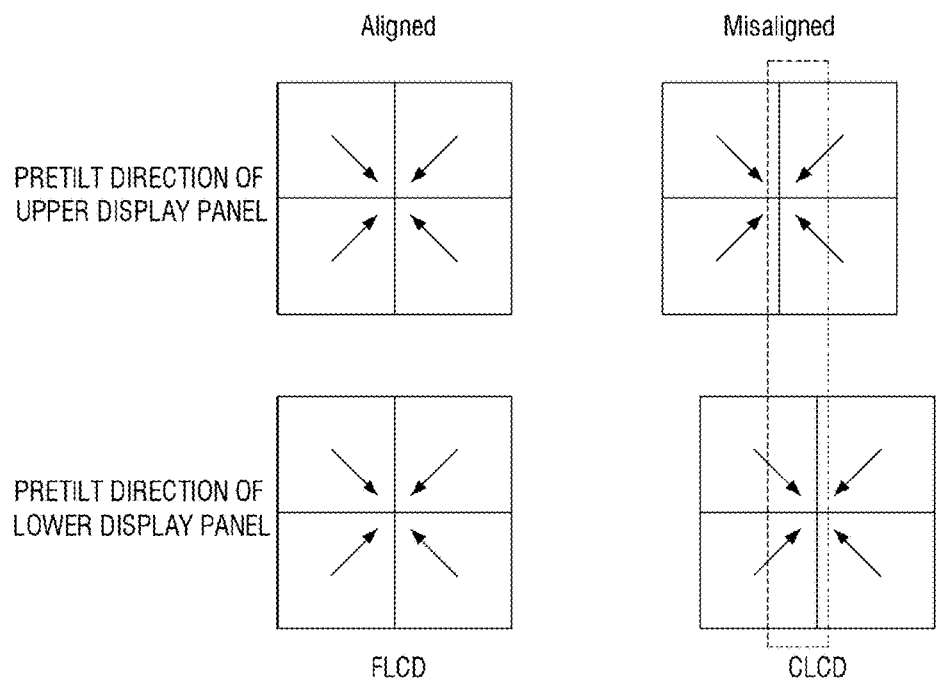

LIQUID CRYSTAL DISPLAY AND METHOD OF MANUFACTURING THE SAME

This application claims priority to Korean Patent Application No. 10-2015-0136694, filed on Sep. 25, 2015, and all the benefits accruing therefrom under 35 U.S.C. § 119, the content of which in its entirety is herein incorporated by reference.

BACKGROUND

1. Field of the Invention

The present invention relates to a liquid crystal display (LCD) and a method of manufacturing the same.

2. Description of the Related Art

Liquid crystal displays (LCDs) are one of the most widely used types of flat panel displays. Generally, an LCD includes a pair of display panels having electric field generating electrodes, such as pixel electrodes and a common electrode, and a liquid crystal layer interposed between the display panels.

The LCD generates an electric field in the liquid crystal layer by applying voltages to the electric field generating electrodes and thereby generating an electric field in the liquid crystal layer. Accordingly, the alignment of liquid crystals in the liquid crystal layer is determined by the electric field, and polarization of incident light is controlled. As a result, an image is displayed on the LCD.

As LCDs are increasingly used as displays for television receivers, the screen size of the LCD is becoming larger in size. As the size of the LCDs increases, the quality of the image may greatly differ depending on the viewpoint of the viewer, i.e. whether a viewer watches a central part of the screen or a right or left side of the screen.

To compensate for this difference in the viewpoint, LCDs may be curved (concave or convex). From the perspective of a viewer, curved LCDs may be classified into portrait-type LCDs and landscape-type LCDs. The portrait-type LCDs have a vertical length greater than the horizontal length and are curved in a vertical direction, while the landscape-type LCDs have a vertical length smaller than their horizontal length and are curved in a horizontal direction.

SUMMARY

Aspects of the present invention provide a liquid crystal display (LCD) in which a pretilt angle of liquid crystal molecules aligned on a surface of an upper display panel and a pretilt angle of liquid crystal molecules aligned on a surface of a lower display panel are different.

Aspects of the present invention also provide a method of manufacturing an LCD, the method applicable to both a curved LCD and a flat panel LCD.

Aspects of the present invention further provide a curved LCD having improved light transmittance.

According to an aspect, a liquid crystal display (LCD) includes a thin-film transistor (TFT) array substrate, a counter substrate facing the TFT array substrate, a liquid crystal layer including liquid crystal molecules having negative dielectric anisotropy and disposed between the TFT array substrate and the counter substrate, a first liquid crystal alignment base layer disposed between the liquid crystal layer and the counter substrate and including a first compound, a first liquid crystal alignment stabilization layer including first protrusions including first polymers of reactive mesogens disposed on a surface of the first liquid crystal alignment base layer, wherein the first protrusions are separated from each other, a second liquid crystal alignment base layer disposed between the liquid crystal layer and the TFT array substrate and including a second compound different from the first compound and a second liquid crystal alignment stabilization layer including second protrusions including second polymers of reactive mesogens disposed on a surface of the second liquid crystal alignment base layer, wherein the second protrusions are separated from each other.

In one aspect, the second protrusions including the second polymers of reactive mesogens may have a larger average size than the first protrusions including the first polymers of the reactive mesogens.

In another aspect, the second protrusions including the second polymers of reactive mesogens may have a smaller average size than the first protrusions including the first polymers of the reactive mesogens.

According to another aspect, a method of manufacturing an LCD includes forming a first coating layer by forming a patternless electrode which does not have domain partition mean on a counter substrate facing a TFT array substrate and coating a first liquid crystal vertical alignment agent including first reactive mesogens on the patternless electrode; forming a second coating layer by forming a patterned electrode including domain partition means on the TFT array substrate and coating a second liquid crystal vertical alignment agent including polymerization initiators and second reactive mesogens on the patterned electrode, wherein the second reactive mesogens are different from the first reactive mesogens; manufacturing an LCD panel by forming a liquid crystal layer between the TFT array substrate and the counter substrate and bonding the TFT array substrate and the counter substrate together, wherein the liquid crystal layer comprises a liquid crystal composition comprising liquid crystal molecules; forming a first liquid crystal alignment base layer on the patternless electrode and a second liquid crystal alignment base layer on the patterned electrode by heat-treating the LCD panel; and forming a first liquid crystal alignment stabilization layer and a second liquid crystal alignment layer by irradiating ultraviolet light onto the LCD panel, wherein the first liquid crystal alignment layer includes first protrusions including first polymers of the first reactive mesogens disposed on the first liquid crystal alignment base layer, wherein the first protrusions are separated from each other and a second liquid crystal alignment stabilization layer including second protrusions including second polymers of the second reactive mesogens disposed on the second liquid crystal alignment base layer, wherein the second protrusions are separated from each other.

BRIEF DESCRIPTION OF THE DRAWINGS

The above and other aspects and features of the present invention will become more apparent by describing in detail exemplary embodiments thereof with reference to the attached drawings, in which:

FIGS. 1A and 1B through FIG. 4 are cross-sectional views schematically illustrating an exemplary embodiment of a method of manufacturing a liquid crystal display (LCD), in which FIG. 1B is an exploded view of the circled portion of FIG. 1A.

FIG. 11 illustrates the misalignment of a pretilt direction of an upper display panel and a pretilt direction of a lower display panel which occurs due to the misalignment of the upper display panel and the lower display panel included in the curved LCD;

DETAILED DESCRIPTION

Figure 1A:
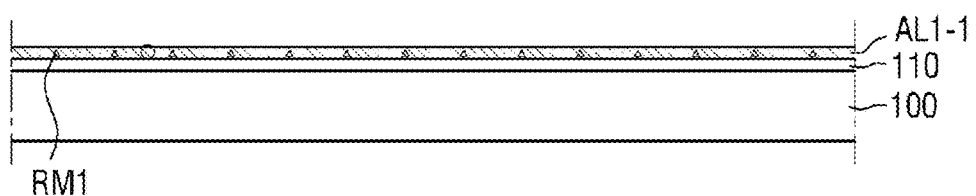

Features of the inventive concept and methods of accomplishing the same may be understood more readily by referencing the following detailed description of preferred embodiments and the accompanying drawings. The inventive concept may, however, be embodied in many different forms and are not limited to the embodiments set forth herein. Rather, these embodiments are provided to help illustrate the inventive concept to those of ordinary skill in the art.

In the drawings, the thickness of layers and regions are exaggerated for clarity. It will be understood that when an element or layer is referred to as being "on", "connected to" or "coupled to" another element or layer, the element or layer may be directly on, connected or coupled to another element or layer, or intervening elements or layers. In contrast, when an element is referred to as being "directly on", "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections are not limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "below", "lower", "under", "above", "upper" and the like, may be used herein for ease of description to describe the relationship of one element or feature to another element(s) or feature(s) as illustrated in the figures. It will be understood that the spatially related terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially related descriptors used herein may be interpreted accordingly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises", "comprising", "includes" and/or "including", when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Exemplary embodiments of the present disclosure are described hereinafter with reference to the accompanying drawings.

FIGS. 1 through 4 are cross-sectional views schematically illustrating a method of manufacturing a flat panel liquid crystal display (LCD) 500. FIG. 5 is a schematic cross-sectional view of an exemplary embodiment of a flat panel LCD 500.

Referring to FIGS. 1 through 5, the method of manufacturing the flat panel LCD 500 includes a first layer formation process, a second layer formation process, a panel manufacturing process, a heat treatment process and an ultraviolet (UV) light irradiation process.

Figure 1B:
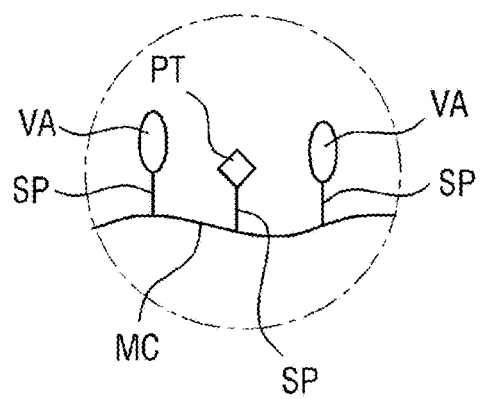
Figure 2A:
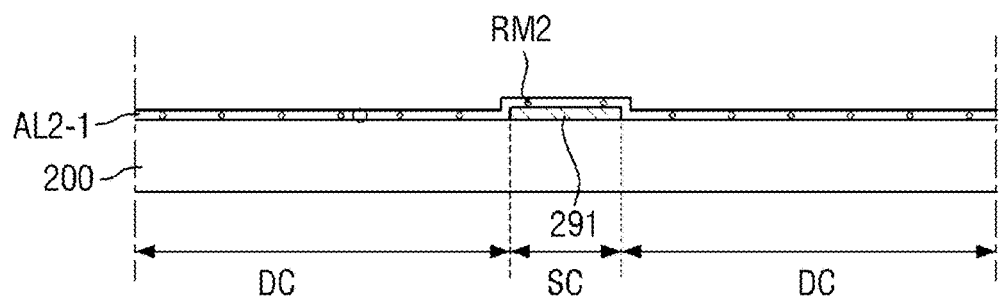
Figure 2B:
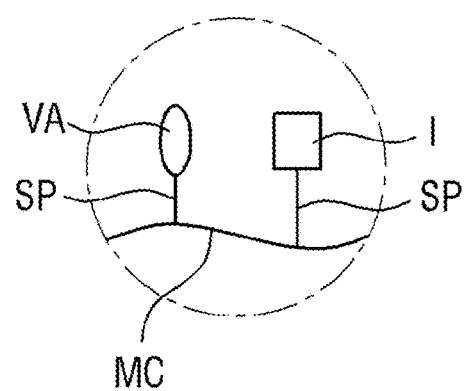
FIG. 2B is an exploded view of the circled portion of FIG. 2A.

The first layer formation process is illustrated in FIGS. 1A and 1B, and the second layer formation process is illustrated in FIGS. 2A and 2B. Referring to FIGS. 1A, 1B, 2A, and 2B, the first layer formation process may include forming a patternless electrode 110 without domain partition means on a counter substrate 100 which faces a thin-film transistor (TFT) array substrate 200 and forming a first coating layer AL1-1 by coating a first liquid crystal vertical alignment agent, which includes first reactive mesogens RM1, on the patternless electrode 110. The second layer formation process may include forming a patterned electrode 291 having domain partition means on the TFT array substrate 200 and forming a second coating layer AL2-1 by coating a second liquid crystal vertical alignment agent, which includes polymerization initiators and second reactive mesogens RM2 different from the first reactive mesogens RM1, on the patterned electrode 291.

The patternless electrode 110 may be a common electrode, and the patterned electrode 291 may be a pixel electrode. The patterned electrode 291 may include a cross-shaped stem SC, micro branches (not shown) extending from the cross-shaped stem SC, and slits DC disposed between the micro branches.

The first liquid crystal vertical alignment agent may be a liquid crystal alignment agent that includes a polymer compound (FIG. 1B) having a main chain MC and vertical alignment groups VA as side chains. For example, the liquid crystal alignment agent may include a polyimide-based polymer compound having an imide group as the main chain MC and the vertical alignment groups VA as the side chains. The vertical alignment groups VA may be chemically bonded to the main chain MC by spacers SP. Each of the vertical alignment groups VA may each independently be an alkyl group, a hydrocarbon derivative having an end substituted with an alkyl group, a hydrocarbon derivative having an end substituted with a cycloalkyl group, or a hydrocarbon derivative having an end substituted with an aromatic hydrocarbon.

The first liquid crystal vertical alignment agent may further include a radical collector PT as a side chain. The radical collector PT may be one or more of $C_1$-$C_{10}$ alkylamine, arylamine, heterocyclic amine, furan, and thiophene. The arylamine may be aniline, p-toluidine, or p-anisidine. The heterocyclic amine may be pyrrole, pyrazole, imidazole, indole, pyridine, pyridazine, pyrimidine, quinolone, thiazole, piperidine, or pyrrolidine. The radical collector PT captures cation impurities within a liquid crystal layer by using its unshared electron pair. In so doing, the radical collector PT improves a voltage holding ratio (VHR) of the flat panel LCD 500 (see FIG. 9), thereby reducing afterimage.

The second liquid crystal vertical alignment agent may be a liquid crystal alignment agent that includes a polymer compound (FIG. 2B) having a main chain MC and vertical alignment groups VA as side chains. For example, the liquid crystal alignment agent may include a polyimide-based polymer compound having an imide group as the main chain MC and the vertical alignment groups VA as the side chains. The vertical alignment groups VA may be chemically bonded to the main chain MC by spacers SP. Each of the vertical alignment groups VA may each independently be an alkyl group, a hydrocarbon derivative having an end substituted with an alkyl group, a hydrocarbon derivative having an end substituted with a cycloalkyl group, or a hydrocarbon derivative having an end substituted with an aromatic hydrocarbon.

The second liquid crystal vertical alignment agent may further include a polymerization initiator I as a side chain. The polymerization initiator I may be one or more of, but not limited to, acetophenone, benzoin, benzophenone, diethoxy acetophenone, phenyl ketone, thioxanthone, 2-hydroxy-2-methyl-1-phenylpropan-1-one, 4-(2-hydroxyethoxy)phenyl-(2-hydroxy)-2-propyl ketone, 1-hydroxycyclohexylphenyl ketone, o-benzoylbenzoic acid methyl ester, 4-phenyl benzophenone, 4-benzoyl-4'-methyl-diphenyl sulfide, (4-benzoylbenzyl)trimethyl ammonium chloride, bis(2,4,6-trimethylbenzoyl)-phenylphosphine oxide, diphenyl(2,4,6-trimethylbenzoyl)-phosphine oxide, 2-hydroxy methyl propionitrile, 2,2'-{azobis(2-methyl-N-[1,1'-bis(hydroxymethyl)-2-hydroxyethyl)propionamide]}, acrylic acid [(2-methoxy-2-phenyl-2-benzoyl)-ethyl]ester, phenyl 2-acryloyloxy-2-propyl ketone, phenyl 2-methacryloyloxy-2-propyl ketone, 4-isopropylphenyl 2-acryloyloxy-2-propyl ketone, 4-chlorophenyl 2-acryloyloxy-2-propyl ketone, 4-dodecylphenyl 2-acryloyloxy-2-propyl ketone, 4-methoxyphenyl 2-acryloyloxy-2-propyl ketone, 4-acryloyloxyphenyl 2-hydroxy-2-propyl ketone, 4-methacryloyloxyphenyl 2-hydroxy-2-propyl ketone, 4-(2-acryloyloxyethoxy)-phenyl 2-hydroxy-2-propyl ketone, 4-(2-acryloyloxydiethoxy)-phenyl 2-hydroxy-2-propyl ketone, 4-(2-acryloyloxyethoxy)-benzoin, 4-(2-acryloyloxyethylthio)-phenyl 2-hydroxy-2-propyl ketone, 4-N,N'-bis(2-acryloyloxyethyl)-aminophenyl 2-hydroxy-2-propyl ketone, 4-acryloyloxyphenyl 2-acryloyloxy-2-propyl ketone, 4-methacryloyloxyphenyl 2-methacryloyloxy-2-propyl ketone, 4-(2-acryloyloxyethoxy)-phenyl 2-acryloyloxy-2-propyl ketone, 4-(2-acryloyloxydiethoxy)-phenyl 2-acryloyloxy-2-propyl ketone, dibenzyl ketone, benzoin alkyl ether, benzoin methyl ether, benzoin ethyl ether, benzoin isopropyl ether, benzoin isobutyl ether, dialkyl acetophenone, hydroxyl alkylketone, phenyl glyoxylate, benzyl dimethyl ketal, acyl phosphine, and α-aminoketone.

A pretilt angle of liquid crystal molecules can be adjusted by controlling the concentration of reactive mesogens, the concentration of the polymerization initiator I, heat-treatment conditions, voltages, and light irradiation dose. The protrusions formed by the reactive mesogen polymers can fix or stabilize the tilted state of the liquid crystal molecules aligned on the surface of a liquid crystal alignment layer. The more protrusions of polymers of the reactive mesogens, the greater the tilt angle at which the liquid crystal molecules are aligned.

If other process variables excluding the concentration of the polymerization initiator I are the same, an increase in the concentration of the polymerization initiator I may lead to the formation of more protrusions of the polymers of the reactive mesogens. The polymerization initiator I initiates the polymerization reaction of the reactive mesogens. Therefore, the polymerization reaction of the reactive mesogens can be made optional by controlling the concentration of the polymerization initiator I.

A reactive mesogen is a compound having a core mesogen structure having liquid crystal properties and a polymerizable end group for polymerization. For example, the reactive mesogen can be represented by Formula (1) below:

P1-SP1-MG-SP2-PS,  Formula (1)

where P1 and P2 are independently a polymerizable end group such as acrylate group, (meth)acrylate group, acryloyl group, vinyl group, vinyloxy group, or epoxy group, SP1 is a spacer group which connects P1 and MG, such as an alkyl group having 1 to 12 carbon atoms or an alkoxy group having 1 to 12 carbon atoms, SP2 is a spacer group which connects P2 and MG, such as an alkyl group having 1 to 12 carbon atoms or an alkoxy group having 1 to 12 carbon atoms, and MG is a mesogen structure such as cyclohexyl, biphenyl, terphenyl, or naphthalene.

The first reactive mesogens RM1 may be composed of compounds having a different chemical structure from those of the second reactive mesogens RM2. The second reactive mesogens RM2 may be compounds having excellent thermal stability compared with those of the first reactive mesogens RM1.

In an exemplary embodiment, the first reactive mesogens may be at least one of compounds represented by Formulas (2) and (3) below:

Formula (2)

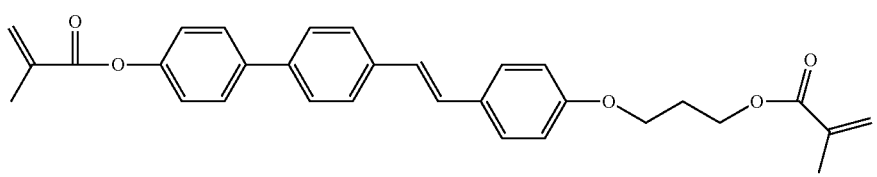

Formula (3)

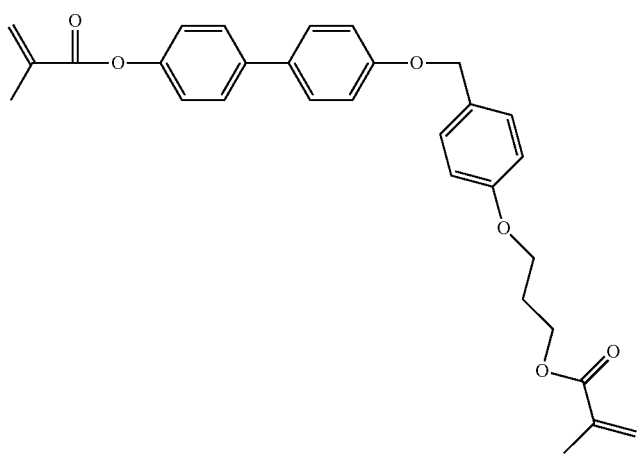

In an exemplary embodiment the second reactive mesogens RM2 may be at least one of compounds represented by Formulas (4) through (6) below:

Formula (4)

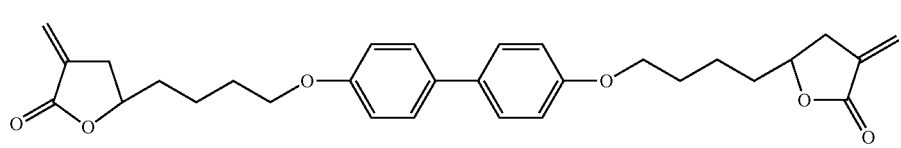

Formula (5)

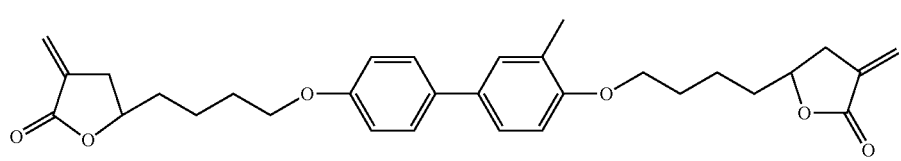

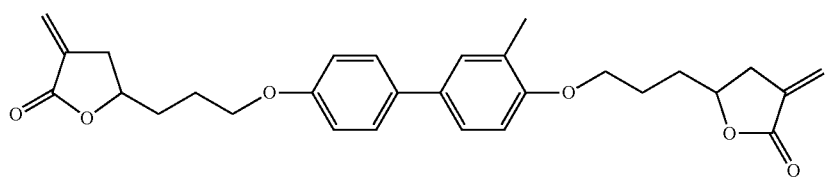

Formula (6)

Figure 3:
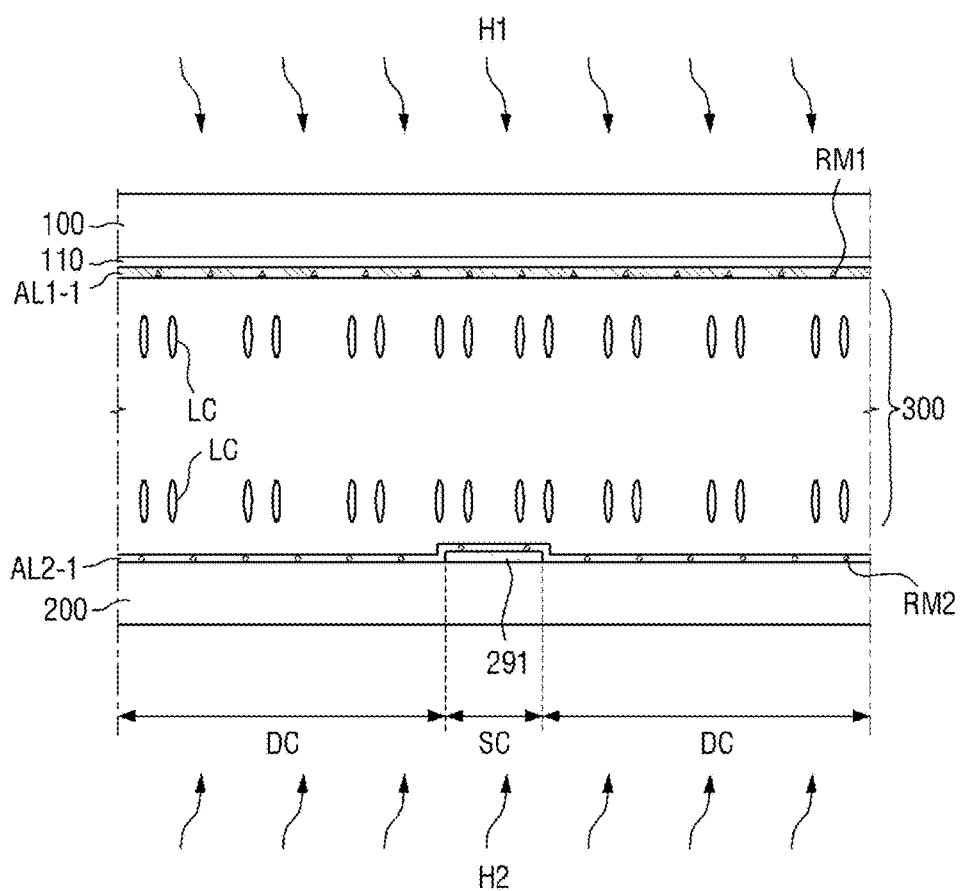
Figure 4:
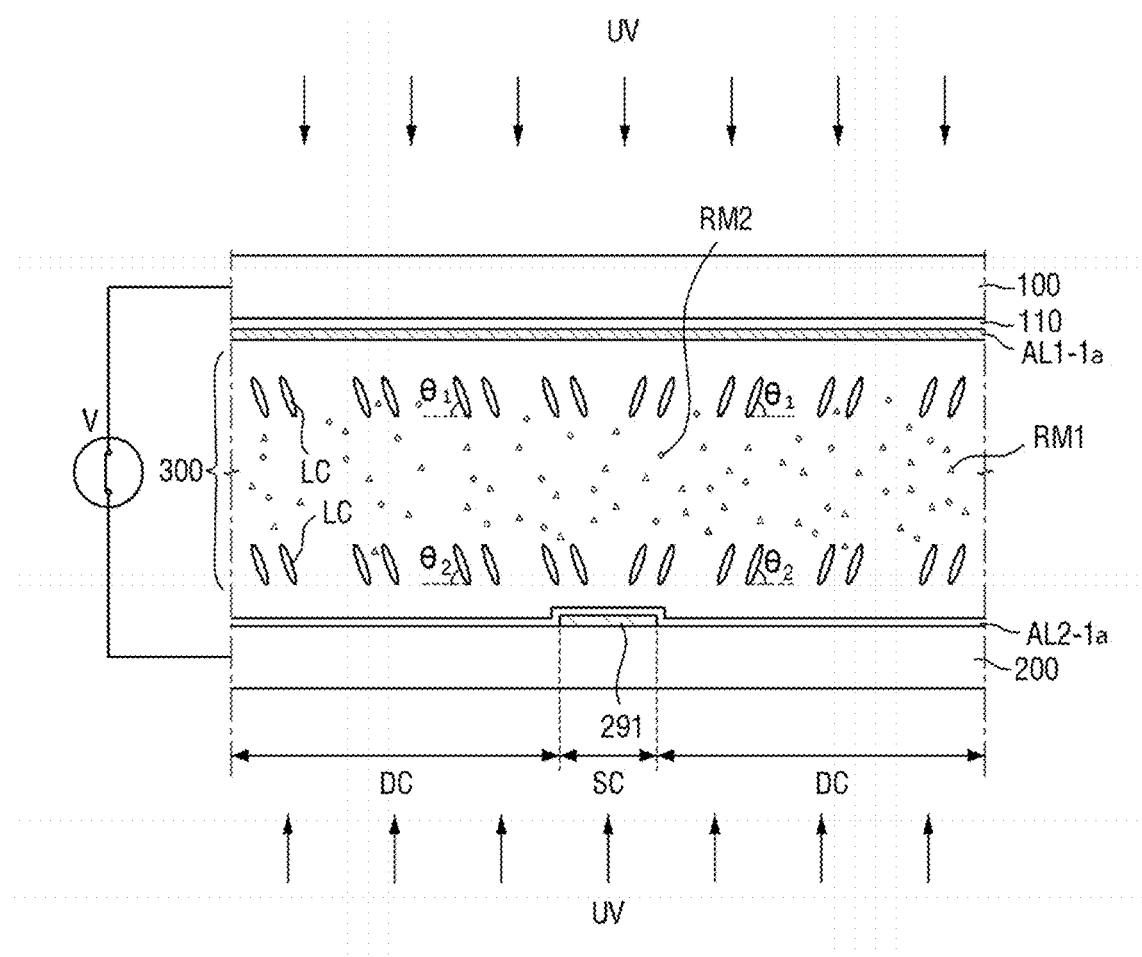
Figure 5:
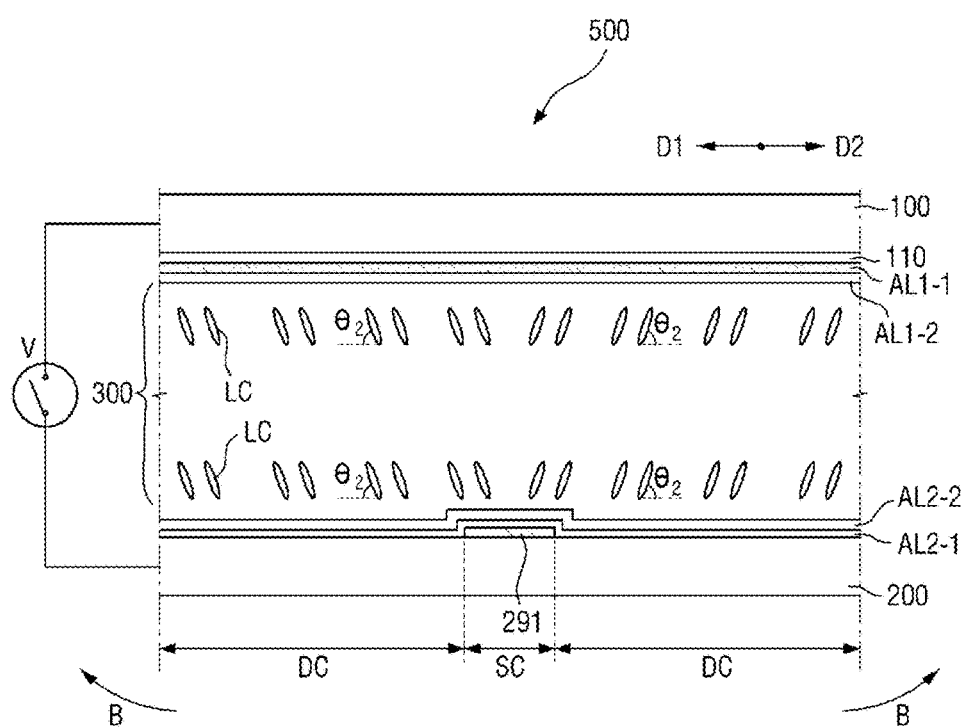
FIG. 5 is a schematic cross-sectional view of an exemplary embodiment of a flat panel liquid crystal display (LCD).

The panel manufacturing process and the heat treatment process are illustrated in FIGS. 3 and 4. Referring to FIG. 3, the panel manufacturing process is a process of forming a liquid crystal layer 300 between the counter substrate 100 and the TFT array substrate 200 using a liquid crystal composition composed of liquid crystal molecules LC and manufacturing an LCD panel by bonding the counter substrate 100 and the TFT array substrate 200 together.

The liquid crystal molecules LC include liquid crystal molecules having negative dielectric anisotropy. The liquid crystal molecules having negative dielectric anisotropy are aligned substantially perpendicular to the counter substrate 100 and the TFT array substrate 200 by the vertical alignment groups VA (see FIGS. 1 and 2). Here, when the liquid crystal molecules having the negative dielectric anisotropy are aligned substantially perpendicular to the counter substrate 100 and the TFT array substrate 200, it means that the liquid crystal molecules having the negative dielectric anisotropy are aligned at a pretilt angle of about 88 to about 90 degrees (°) relative to the counter substrate 100 and the TFT array substrate 200. The pretilt angle denotes an angle between each of the counter substrate 100 and the TFT array substrate 200 and the directors of the liquid crystal molecules having the negative dielectric anisotropy. A poloidal angle denotes an angle between a virtual vertical line perpendicular to the counter substrate 100 and the TFT array substrate 200 and the directors of the liquid crystal molecules having the negative dielectric anisotropy.

The liquid crystal molecules having the negative dielectric anisotropy will hereinafter be referred to as negative liquid crystal molecules.

Referring to FIGS. 3 and 4, the heat treatment process is performed to control the spread of the liquid crystal molecules LC. The LCD panel is heat-treated to form a first liquid crystal alignment base layer AL1-1a on the patternless electrode 110 and a second liquid crystal alignment base layer AL2-1a on the patterned electrode 291.

The first liquid crystal alignment base layer AL1-1a may be composed of a polyimide-based compound represented by Formula (7) below:

Formula (7)

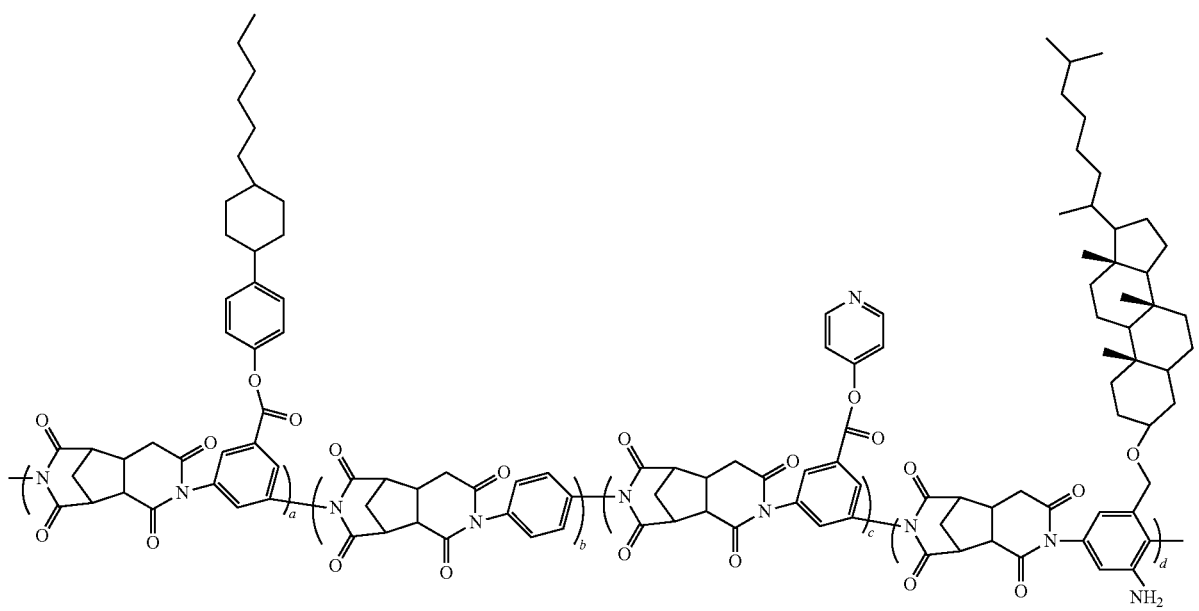

The second liquid crystal alignment base layer AL2-1a may be composed of a polyimide-based compound represented by Formula (8) below:

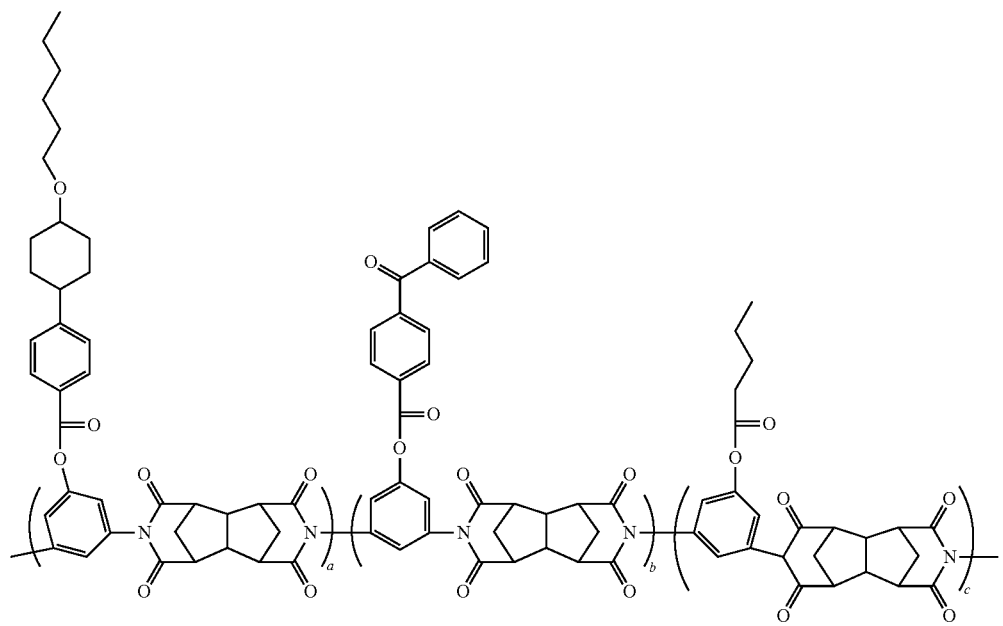

Formula (8)

In Formulas (7) and (8), a, b, c and d are each independently a natural number of 1 to 300.

The first coating layer AL1-1 may be heat-treated at a first heat-treatment temperature H1, and the second coating layer AL2-1 may be heat-treated at a second heat-treatment temperature H2. The first heat-treatment temperature H1 and the second heat-treatment temperature H2 may be substantially the same. Each of the first heat-treatment temperature H1 and the second heat-treatment temperature H2 may be in a range of for example, about 200° C. to less than about 230° C.

The first reactive mesogens RM1 and the second reactive mesogens RM2 in the first coating layer AL1-1 and the second coating layer AL2-1 flow into the liquid crystal layer 300 as a result of the heat-treatment processes H1 and H2.

The UV light irradiation process is illustrated in FIGS. 4 and 5. Referring to FIGS. 4 and 5, the UV light irradiation process is a process of irradiating UV light onto the LCD panel in a state where an electric field is applied to the LCD panel. In this process, the first and second reactive mesogens RM1 and RM2 within the liquid crystal layer 300 can be polymerized. The irradiation of the UV light to the LCD panel causes a first liquid crystal alignment stabilization layer AL1-2 and a second liquid crystal alignment stabilization layer AL2-2 to be formed on the first liquid crystal alignment base layer AL1-1a and the second liquid crystal alignment base layer AL2-1a, respectively. Here, the first liquid crystal alignment stabilization layer AL1-2 and the second liquid crystal alignment stabilization layer AL2-2 are composed of polymers of reactive mesogens which include polymers of the first reactive mesogens RM and/or polymers of the second reactive mesogens RM2.

The first liquid crystal alignment stabilization layer AL1-2 may have a structure in which first protrusions composed of the polymers of the reactive mesogens are disposed on the first liquid crystal alignment base layer AL1-1a and are separated from each other. The second liquid crystal alignment stabilization layer AL2-2 may have a structure in which second protrusions composed of the polymers of the reactive mesogens are disposed on the second liquid crystal alignment base layer AL2-1a and are separated from each other.

Referring to FIG. 4, the irradiation of the UV light to the LCD panel causes negative liquid crystal molecules LC on the surface of the first liquid crystal alignment base layer AL1-1a to be aligned at a predetermined pretilt angle $\theta 1$ relative to the counter substrate 100 and negative liquid crystal molecules LC on the surface of the second liquid crystal alignment base layer AL2-1a to be aligned at a predetermined pretilt angle $\theta 2$ relative to the TFT array substrate 200. Here, the pretilt angle $\theta 1$ and the pretilt angle $\theta 2$ are different.

Referring to FIG. 5, once the electric field is removed, the negative liquid crystal molecules LC on the surface of the first liquid crystal alignment stabilization layer AL1-2 and the negative liquid crystal molecules LC on the surface of the second liquid crystal alignment base layer AL2-2 remain tilted at the pretilt angles $\theta 1$ and $\theta 2$ relative respectively to the counter substrate 100 and the TFT array substrate 200.

The first liquid crystal alignment stabilization layer AL1-2 can stabilize or fix the tilted state of the negative liquid crystal molecules LC aligned on the surface of the first liquid crystal alignment stabilization layer AL1-2. The second liquid crystal alignment stabilization layer AL2-2 can fix or stabilize the tilted state of the negative liquid crystal molecules LC aligned on the surface of the second liquid crystal alignment stabilization layer AL2-2.

Figure 6:
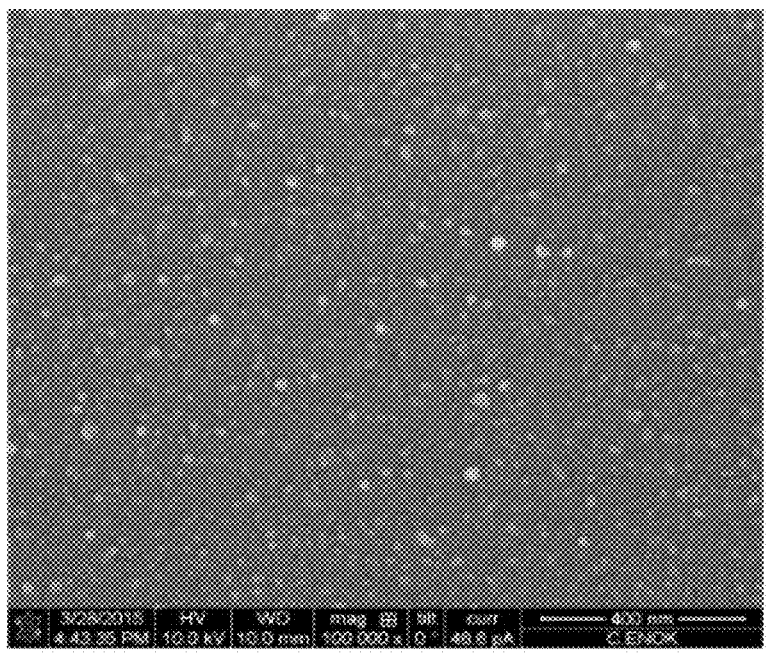
FIG. 6 is a surface image of an exemplary embodiment of the first liquid crystal alignment stabilization layer of the LCD in FIG. 5.
Figure 7:
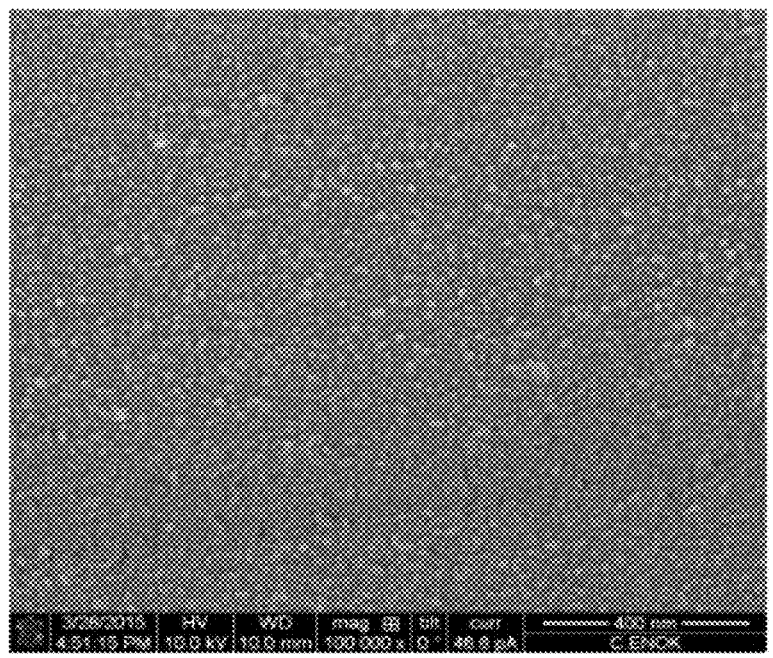
FIG. 7 is a surface image of an exemplary embodiment of the second liquid crystal stabilization layer of the LCD in FIG. 5.
Figure 8:
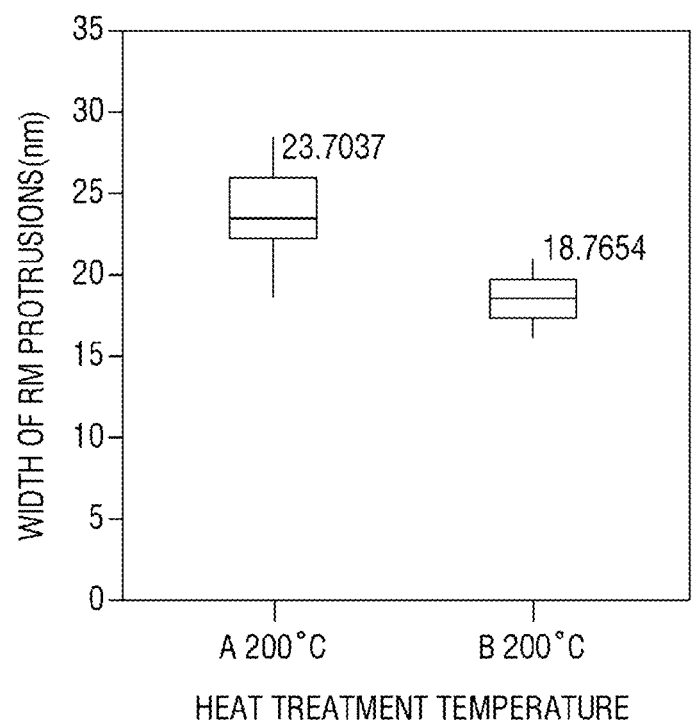
FIG. 8 is a graph illustrating an average size (width, nanometers) versus heat treatment temperature (° C.) of first protrusions (A) that form the first liquid crystal alignment stabilization layer of the LCD in FIG. 5 and second protrusions (B) that form the second liquid crystal alignment stabilization layer of the LCD of FIG. 5.

FIG. 6 is a surface image of the first liquid crystal alignment stabilization layer AL1-2 of the LCD in FIG. 5. FIG. 7 is a surface image of the second liquid crystal stabilization layer AL2-2 of the LCD in FIG. 5. FIG. 8 is a graph illustrating an average size versus the heat treatment temperature of the first protrusions that form the first liquid crystal alignment stabilization layer AL1-2 and the second protrusions that form the second liquid crystal alignment stabilization layer AL2-2, for the LCD of FIG. 5.

Referring to FIGS. 6 through 8, when the heat-treatment temperature for both the first coating layer AL1-1 and the second coating layer AL2-1 is 200° C., the average size (A-200° C.) of the first protrusions is larger than the average size (B-200° C.) of the second protrusions.

A difference between the average size (A-200° C.) of the first protrusions and the average size (B-200° C.) of the second protrusions can result in a difference between a pretilt angle of first liquid crystal molecules aligned on the surface of the first liquid crystal alignment stabilization layer AL1-2 and a pretilt angle of second liquid crystal molecules aligned on the surface of the second liquid crystal alignment stabilization layer AL2-2.

Figure 9:
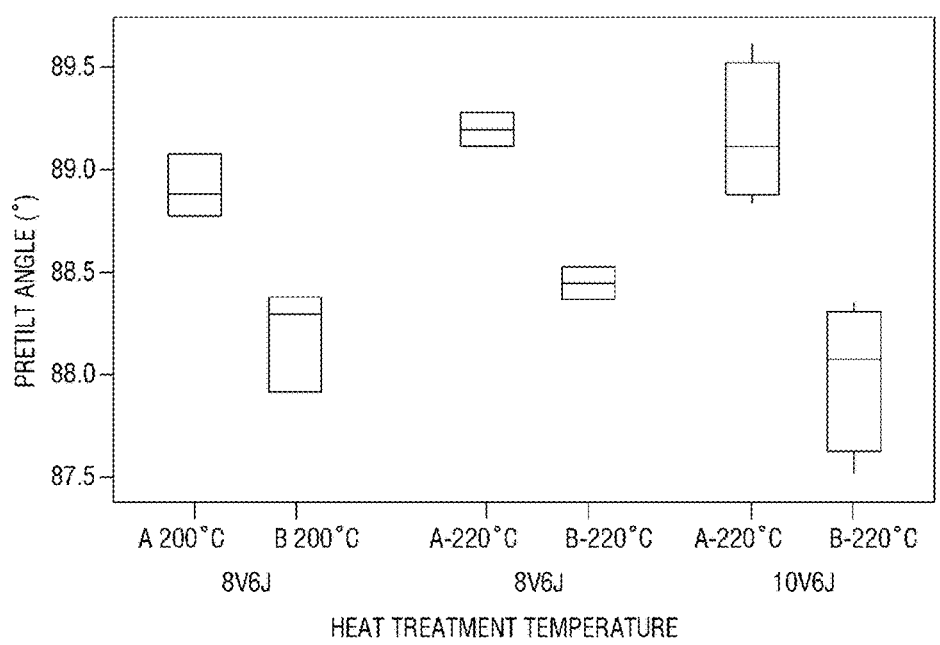
FIG. 9 is a graph illustrating a pretilt angle (°) versus heat treatment temperature of liquid crystal molecules aligned on a surface of the first liquid crystal alignment stabilization layer and liquid crystal molecules aligned on a surface of the second liquid crystal alignment stabilization layer, for the LCD of FIG. 5.

FIG. 9 is a graph illustrating the pretilt angle versus the heat treatment temperature of the first liquid crystal molecules aligned on the surface of the first liquid crystal alignment stabilization layer AL1-2 and the pretilt angle of the second liquid crystal molecules aligned on the surface of the second liquid crystal alignment stabilization layer AL2-2, for the LCD of FIG. 5.

Referring to FIG. 9, in a case where the heat-treatment temperature of the first coating layer AL1-1 was 200° C., where the heat-treatment temperature of the second coating layer AL2-1 was 200° C., and where the intensity of the UV light was 8 volts (V), 6 joules (J), the average pretilt angle of the first liquid crystal molecules aligned on the surface of the first liquid crystal alignment stabilization layer AL1-2 was 88.91 degrees, and the average pretilt angle of the second liquid crystal molecules aligned on the surface of the second liquid crystal alignment stabilization layer AL2-2 was 88.20 degrees.

Referring to FIG. 9, in a case where the heat-treatment temperature of the first coating layer AL1-1 was 220° C., where the heat-treatment temperature of the second coating layer AL2-1 was 220° C., and where the intensity of the UV light was 8V, 6 J, the average pretilt angle of the first liquid crystal molecules aligned on the surface of the first liquid crystal alignment stabilization layer AL1-2 was 89.20 degrees, and the average pretilt angle of the second liquid crystal molecules aligned on the surface of the second liquid crystal alignment stabilization layer AL2-2 was 88.45 degrees.

Referring to FIG. 9, in a case where the heat-treatment temperature of the first coating layer AL1-1 was 220° C., where the heat-treatment temperature of the second coating layer AL2-1 was 220° C., and where the intensity of the UV light was 10V, 6 J, the average pretilt angle of the first liquid crystal molecules aligned on the surface of the first liquid crystal alignment stabilization layer AL1-2 was 89.15 degrees, and the average pretilt angle of the second liquid crystal molecules aligned on the surface of the second liquid crystal alignment stabilization layer AL2-2 was 88.00 degrees.

Table 1 below summarizes the results of measuring the pretilt angle of the first crystal molecules aligned on the surface of the first liquid crystal alignment stabilization layer AL1-2 and the pretilt angle of the second liquid crystal molecules aligned on the surface of the second liquid crystal alignment stabilization layer AL2-2.

TABLE 1

| | Heat-treatment temperature | | | | | |
|---|---|---|---|---|---|---|
| | 200° C. | | 220° C. | | | |
| | Exposure condition | | | | | |
| | 8 V, 6 J | | 8 V, 6 J | | 10 V, 6 J | |
| | Substrate | | | | | |
| | Counter sub-strate | TFT array sub-strate* | Counter sub-strate | TFT array sub-strate | Counter sub-strate | TFT array sub-strate |
| Number of samples | 4 | 4 | 2 | 1 | 4 | 4 |
| Minimum pretilt angle | 88.78° | 87.91° | 89.12° | 88.37° | 88.84° | 87.51° |
| Maximum pretilt angle | 89.08° | 88.39° | 89.28° | 88.53° | 89.62° | 88.35° |
| Average pretilt angle | 88.91° | 88.20° | 89.20° | 88.45° | 89.15° | 88.00° |
| Standard deviation | 0.15 | 0.25 | 0.11 | 0.11 | 0.36 | 0.36 |

Referring to FIG. 9 and Table 1, the first liquid crystal molecules aligned on the surface of the first liquid crystal alignment stabilization layer AL1-2 and the second liquid crystal molecules aligned on the surface of the second liquid crystal alignment stabilization layer AL2-2 can be made to have different pretilt angles. This is done by forming the first vertical liquid crystal alignment agent and the second vertical liquid crystal alignment agent using heterogeneous compounds, forming the first reactive mesogens RM1 and the second reactive mesogens RM2 using heterogeneous compounds, and employing different process conditions such as heat-treatment temperatures or UV light exposure conditions.

Figure 10:
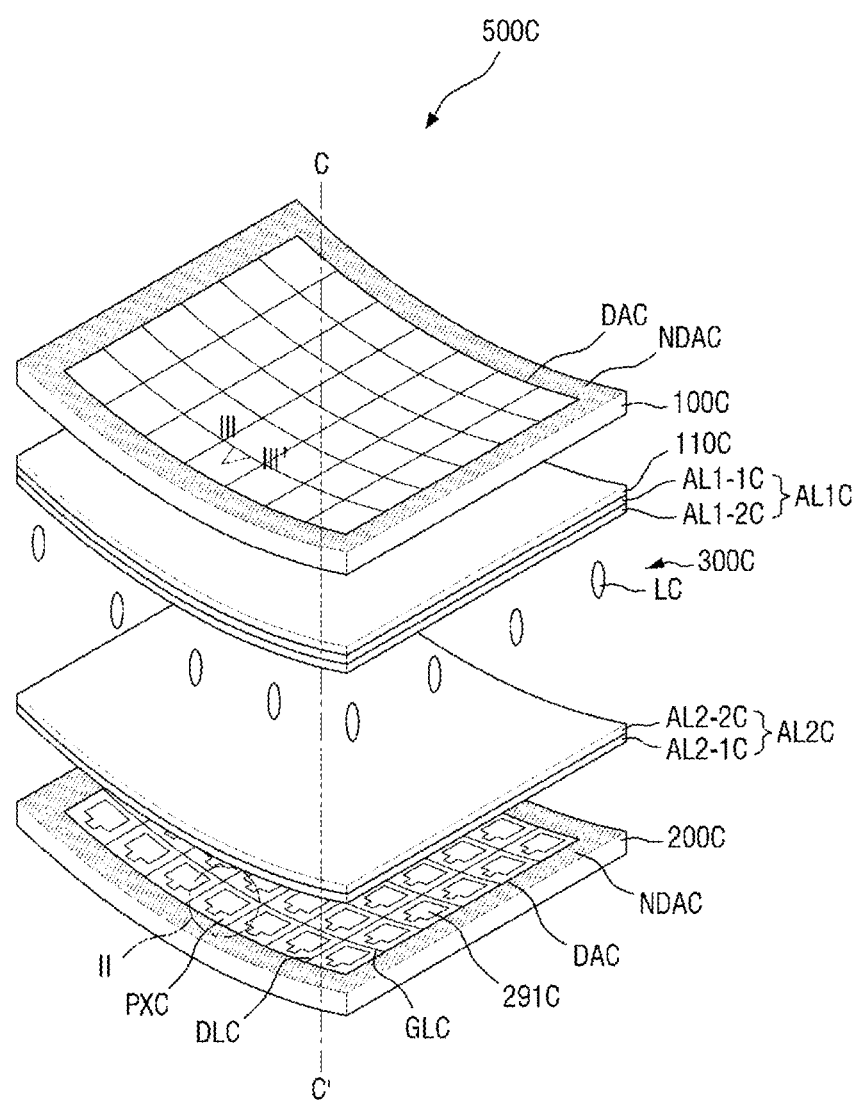
FIG. 10 is a schematic exploded perspective view of an exemplary embodiment of a curved LCD.

FIG. 10 is a schematic exploded perspective view of an exemplary embodiment of a curved LCD 500C. FIG. 11 illustrates the misalignment of a pretilt direction of an upper display panel and a pretilt direction of a lower display panel which occurs due to the misalignment of the upper display panel and the lower display panel included in the curved LCD 500C. The curved LCD 500C of FIG. 10 can be manufactured by bending both ends of the flat panel LCD 500 manufactured according to the processes illustrated in FIGS. 1 through 5.

Referring to FIGS. 5, 10, and 11, the curved LCD 500C can be manufactured by bending both ends of the flat panel LCD 500. A surface of the curved LCD 500C which faces a viewer may be concave.

When the curved LCD 500C is manufactured, stress applied to each of an upper flat display panel and a lower flat display panel in the process of bending both ends of the flat panel LCD 500 may cause misalignment of an upper curved display panel and a lower curved display panel. The upper flat display panel includes a counter substrate 100, a patternless electrode 110, a first liquid crystal alignment base layer AL1-1, and a first liquid crystal alignment stabilization layer AL1-2. The lower flat display panel includes a TFT array substrate 200, a patterned electrode 291, a second liquid crystal alignment base layer AL2-1, and a second liquid crystal alignment stabilization layer AL2-2. The upper curved display panel includes a counter substrate 100C, a common electrode 110C, a first liquid crystal alignment base layer AL1-1C, and a first liquid crystal alignment stabilization layer AL1-2C. The lower curved display panel includes a TFT array substrate 200C, a patterned electrode 291C, a second liquid crystal alignment base layer AL2-1C, and a second liquid crystal alignment stabilization layer AL2-2C.

In the process of bending the flat LCD 500, for example, the upper curved display panel may be shifted in a direction to the left D1 or to the right D2 from the lower curved display panel. In this case, the arrangement of the upper curved display panel and the lower curved display panel may become different from the pre-designed arrangement of the upper flat display panel and the lower flat display panel. This misalignment of the upper curved display panel and the lower curved display panel can degrade the display quality of the curved LCD 500C.

For example, in the flat panel LCD 500, the upper flat display panel may include the first liquid crystal alignment stabilization layer AL1-2, and the lower flat display panel may include the second liquid crystal alignment stabilization layer AL2-2. In addition, negative liquid crystals on the surface of the first liquid crystal alignment stabilization layer AL1-2 and negative liquid crystals on the surface of the second liquid crystal alignment stabilization layer AL2-2 may be aligned at the same pretilt angle relative to the counter substrate 100 and the TFT array substrate 200, thereby forming a plurality of domains. If the curved LCD 500C is manufactured using the above flat panel LCD 500, the misalignment of the upper and lower flat display panels, due to stress applied to each of the upper and lower flat display panels, can cause boundary regions of the domains to be misaligned with each other.

Referring to FIG. 11, the misalignment (indicated by a dotted quadrilateral on the right side of the drawing) of the boundary regions of the domains, due to the misalignment of the upper and lower flat display panels, causes interference or collision between negative liquid crystal molecules aligned on the surface of the first liquid crystal alignment stabilization layer AL1-2 and negative liquid crystal molecules aligned on the surface of the second liquid crystal alignment stabilization layer AL2-2. Accordingly, negative liquid crystal molecules located between the negative liquid crystal molecules aligned on the surface of the first liquid crystal alignment stabilization layer AL1-2 and the negative liquid crystal molecules aligned on the surface of the second liquid crystal alignment stabilization layer AL2-2 can be aligned substantially vertically. As a result, texture in the part (indicated by the dotted quadrilateral on the right side of the drawing) of the curved LCD 500C can be seen as a stain or a dark portion, and the light transmittance of the curved LCD 500C can be reduced.

In the exemplary embodiment of the curved LCD 500C, the pretilt angle of the negative liquid crystal molecules aligned on the surface of the first liquid crystal alignment stabilization layer AL1-2 and the pretilt angle of the negative liquid crystal molecules aligned on the surface of the second liquid crystal alignment stabilization layer AL2-2 are different, thereby reducing or preventing the generation of the above texture.

Figure 12A:
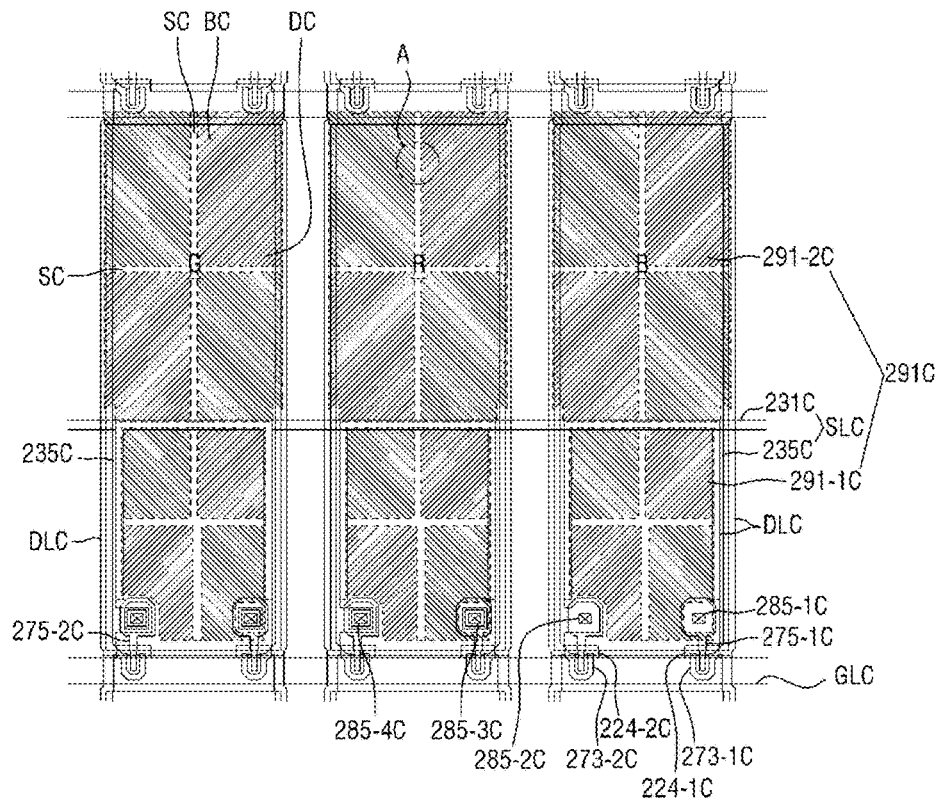
FIG. 12A is a schematic diagram of an exemplary embodiment of a pixel electrode in region II of FIG. 10
Figure 12B:
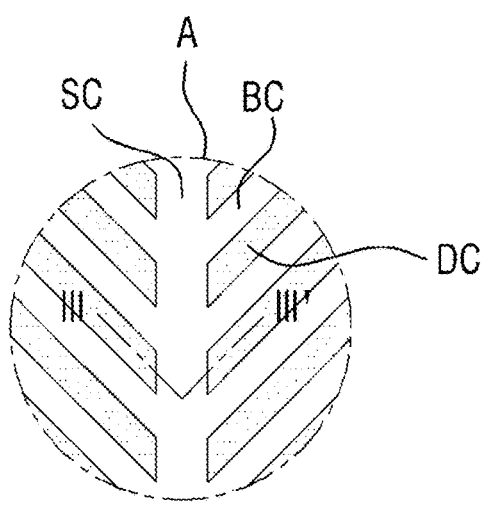
FIG. 12B is an exploded view of the slit pattern of the pixel electrode.

FIG. 12A is a schematic diagram of a pixel electrode in a region II of FIG. 10 and FIG. 12B is an exploded view of the slit pattern of the pixel electrode.

Referring to FIGS. 10 and 12, the curved LCD 500C includes the counter substrate 100C facing the TFT array substrate 200C, the TFT array substrate 200C, and a liquid crystal layer 300C. The liquid crystal layer 300C may be disposed between the counter substrate 100C and the TFT array substrate 200C.

Each of the counter substrate 100C and the TFT array substrate 200C includes a display area DAC and anon-display area NDAC. The display area DAC is an area where an image is displayed, and the non-display area NDAC is an area where no image is displayed. The non-display area NDAC surrounds the display area DAC.

A common electrode 110C may be disposed between the counter substrate 100C and the TFT array substrate 200C and may not have domain partition means. The common electrode 110C may be a patternless electrode. The pixel electrode 291C may be disposed between the TFT array substrate 200C and the common electrode 110C and have the domain partition means. The pixel electrode 291C may be a patterned electrode. The domain partition means may be, for example, a protrusion pattern or a slit pattern. The slit pattern may include a cross-shaped stem SC, micro branches BC extending from the cross-shaped stem SC, and slits DC disposed between the micro branches BC.

The liquid crystal layer 300C may be disposed between the common electrode 110C and the pixel electrode 291C. The liquid crystal layer 300C may include liquid crystal molecules LC having negative dielectric anisotropy.

A first liquid crystal alignment layer AL1C may be disposed between the common electrode 110C and the liquid crystal layer 300C. A second liquid crystal alignment layer AL2C may be disposed between the pixel electrode 291C and the liquid crystal layer 300C. The first liquid crystal alignment layer AL1C may include the first liquid crystal alignment base layer AL1-1C and the first liquid crystal alignment stabilization layer AL1-2C. The second liquid crystal alignment layer AL2C may include the second liquid crystal alignment base layer AL2-1C and the second liquid crystal alignment stabilization layer AL2-2C.

The display area DAC of the TFT array substrate 200C may include a plurality of gate lines GLC extending along a first direction and a plurality of data lines DLC extending along a second direction perpendicular to the first direction. The pixel electrode 291C may be disposed in each of pixels PXC defined by the gate lines GLC and the data lines DLC.

The pixel electrode 291C may include subpixel electrodes 291-1C and 291-2C separated from each other. For example, each of the subpixel electrodes 291-1C and 291-2C may have a quadrilateral shape. Each of the subpixel electrodes 291-1C and 291-2C may be a patterned electrode having a slit pattern. Specifically, the slit pattern may consist of a cross-shaped stem SC, micro branches BC extending from the cross-shaped stem SC, and slits DC disposed between the micro branches BC. The cross-shaped stem SC may be shaped like a cross (+) having a horizontal stem part and a vertical stem part intersecting each other, and the micro branches BC may extend radially from the cross-shaped stem SC in a direction at an angle of approximately 45 degrees to the cross-shaped stem SC. Surfaces of the slits DC which face each other with the horizontal stem part interposed therebetween may be substantially parallel to each other along a horizontal direction. Surfaces of the slits DC which face each other with the vertical stem part interposed therebetween may be substantially parallel to each other along a vertical direction.

A gate line GLC may include gate electrodes 224-1C and 224-2C which protrude from the gate line GLC in the second direction toward the pixel electrode 291C. A plurality of data lines DLC may include source electrodes 273-1C and 273-2C and drain electrodes 275-1C and 275-2C. The source electrodes 273-1C and 273-2C may extend from the data lines DLC in a "U" shape. The drain electrodes 275-1C and 275-2C may be separated from the source electrodes 273-1C and 273-2C.

The pixel electrode 291C may receive data voltages through TFTs. The gate electrodes 224-1C and 224-2C which are control terminals of the TFTs may be electrically connected to the gate line GLC, the source electrodes 273-1C and 273-2C which are input terminals of the TFTs may be electrically connected to the data lines DLC via contact holes 285-1C, 285-2C, 285-3C, and 285-4C, and the drain electrodes 275-1C and 275-2C which are output terminals of the TFTs may be electrically connected to the pixel electrode 291C.

The pixel electrode 291C may generate an electric field together with the common electrode 110C, thereby controlling the alignment direction of the liquid crystal molecules LC of the liquid crystal layer 300 interposed therebetween. The pixel electrode 291C may control the alignment direction of the liquid crystal molecules LC by distorting the electric field.

The TFT array substrate 200C may include a stack of a base substrate (not illustrated) which is made of glass or polymer, the gate electrodes 224-1C and 224-2C, a gate insulating layer (not illustrated), a semiconductor layer (not illustrated), an ohmic contact layer (not illustrated), the source electrodes 273-1C and 273-2C, the drain electrodes 275-1C and 275-2C, a passivation layer (not illustrated), an organic layer (not illustrated), etc.

Channels of the TFTs may be formed of the semiconductor layer. The semiconductor layer may overlap the gate electrodes 224-1C and 224-2C. The source electrodes 273-1C and 273-2C may respectively be separated from the drain electrodes 275-1C and 275-2C with respect to the semiconductor layer.

A storage electrode line SLC may include a stem line 231C extending substantially parallel to the gate lines GLC and a plurality of branch lines 235C extending from the stem line 231C. The storage electrode line SLC can be omitted, and the shape and position of the storage electrode line SLC can be changed variously.

The non-display area NDAC may be a light-blocking area surrounding the display area DAC. A driving unit (not illustrated) which provides a gate driving signal, a data driving signal, etc. to each pixel PXC of the display area DAC may be disposed in the non-display area NDAC of the TFT array substrate 200C. The gate lines GLC and the data lines DLC may extend from the display area DAC to the non-display area NDAC so as to be electrically connected to the driving unit.

The counter substrate 100C may be a counter substrate of the TFT array substrate 200C. The common electrode 110C may be disposed on the counter substrate 100C.

A color filter layer (not illustrated) may be formed in an area corresponding to each pixel PXC of the display area DAC and include a red color filter R, a green color filter G, and a blue color filter B. The color filter layer may be included in any one of the counter substrate 100C and the TFT array substrate 200C. For example, if the counter substrate 100C includes the color filter layer, it may have a structure in which a base substrate (not illustrated) made of glass or polymer, the color filter layer, and an overcoat layer (not illustrated) are stacked. The overcoat layer may be a planarization layer which covers the color filter layer. In this case, the common electrode 110C may be disposed on the overcoat layer.

For example, if the TFT array substrate 200C includes the color filter layer, it may have a color filter-on-array (COA) structure in which color filters are formed on a transparent insulating substrate having TFTs. For example, the color filter layer may be disposed between the passivation layer (not illustrated), which covers the source electrodes 273-1C and 273-2C and the drain electrodes 275-1C and 275-2C, and the organic layer (not illustrated).

A light-blocking pattern layer (not illustrated) may be disposed at the boundary of each color filter R, G, or B. The light-blocking pattern layer may be included in any one of the counter substrate 100C and the TFT array substrate 200C. For example, the light-blocking pattern layer may be a black matrix.

Figure 13:
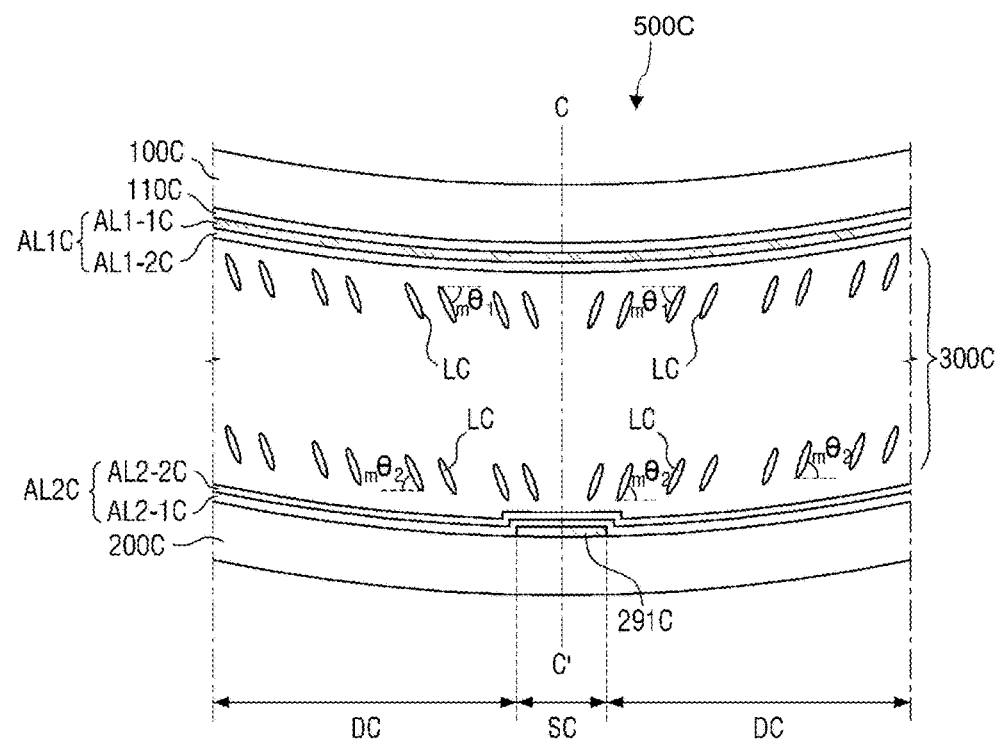
FIG. 13 is a schematic cross-sectional view taken along line III-III' of FIG. 10.

FIG. 13 is a schematic cross-sectional view taken along line III-III' of FIG. 10.

In FIG. 13, the alignment state of the liquid crystal molecules LC in an initial state in which an electric field has not been applied to the curved LCD 500C, is schematically illustrated.

Referring to FIG. 13, the curved LCD 500C includes the first liquid crystal alignment layer MAC and the second liquid crystal alignment layer AL2C. The first liquid crystal alignment layer AL1C may include the first liquid crystal alignment base layer AL1-1C and the first liquid crystal alignment stabilization layer AL1-2C. The first liquid crystal alignment base layer AL1-1C may be a vertical alignment layer having a main chain and vertical alignment groups as side chains. The first liquid crystal alignment base layer AL1-1C may be composed of a first polyimide-based polymer compound having an imide group as the main chain and the vertical alignment groups as the side chains. The vertical alignment groups may be covalently bonded to the main chain by spacers. The first liquid crystal alignment base layer AL1-1C may further include a radical collector. The radical collector may capture cation impurities within a liquid crystal layer through its unshared electron pair. In so doing, the radical collector improves the VHR of the curved LCD 500C thereby reducing afterimage.

The first liquid crystal alignment stabilization layer AL1-2C may be composed of first polymers of reactive mesogens and composed of first protrusions disposed on the surface of the first liquid crystal alignment base layer AL1-1C, the first protrusions separated from each other.

The second liquid crystal alignment layer AL2C may include the second liquid crystal alignment base layer AL2-1C and the second liquid crystal alignment stabilization layer AL2-2C. The second liquid crystal alignment base layer AL2-1C may be the vertical alignment layer. The second liquid crystal alignment base layer AL1-1C may be composed of a second polyimide-based polymer compound different from the first polyimide-based polymer compound. The second liquid crystal alignment base layer AL1-1C may further include a polymerization initiator or a decomposed product of the polymerization initiator.

For example, the first polyimide-based polymer compound may be the compound represented by Formula (7), and the second polyimide-based polymer compound may be the compound represented by Formula (8).

The second liquid crystal alignment stabilization layer AL2-2C may be composed of second polymers of the reactive mesogens and composed of second protrusions disposed on the surface of the second liquid crystal alignment base layer AL2-1C, the second protrusions separated from each other. The average size of the second protrusions is larger than the average size of the first protrusions. A difference between the average size of the first protrusions and the average size of the second protrusions results in a difference between an average pretilt angle $m\theta 1$ of liquid crystal molecules LC aligned on the surface of the first liquid crystal alignment layer AL1C and an average pretilt angle m$\theta$2 of liquid crystal molecules LC aligned on the surface of the second liquid crystal alignment layer AL2C. This difference between the average pretilt angle m$\theta$1 and the average pretilt angle m$\theta$2 determines the alignment direction of the liquid crystal molecules LC on the surface of the first liquid crystal alignment layer AL1C and the alignment direction of the liquid crystal molecules LC on surface of the second liquid crystal alignment layer AL2C.

In a state in which an electric field has not yet been applied to the curved LCD 500C, the liquid crystal molecules LC on the surface of the first liquid crystal alignment layer AL1C are aligned relatively vertical compared to the liquid crystal molecules LC on the surface of the second liquid crystal alignment layer AL2C, and the liquid crystal molecules LC on the surface of the second liquid crystal alignment layer AL2C are tilted at a relatively substantial angle compared to the liquid crystal molecules LC on the first liquid crystal alignment layer AL1C. In other words, the average pretilt angle m$\theta$1 of the liquid crystal molecules LC aligned on the first liquid crystal alignment layer AL1C is greater than the average pretilt angle m$\theta$2 of the liquid crystal molecules LC aligned on the surface of the second liquid crystal alignment layer AL2C (m$\theta$1>m$\theta$2), and the average tilt angle m$\theta$2 of the liquid crystal molecules LC aligned on the surface of the second liquid crystal alignment layer AL2C is smaller than the average pretilt angle m$\theta$1 of the liquid crystal molecules LC aligned on the surface of the first liquid crystal alignment layer AL1C (m$\theta$1>m$\theta$2).

For example, a difference (m$\theta$1−m$\theta$2) between the average pretilt angle m$\theta$1 of the liquid crystal molecules LC aligned on the surface of the first liquid crystal alignment layer AL1C and the average pretilt angle m$\theta$2 of the liquid crystal molecules LC aligned on the surface of the second liquid crystal alignment layer AL2C may be in a range of about 0.7 to about 1.2.

In the curved LCD 500C, at apexes of the upper curved display panel and the lower curved display panel, an average pretilt angle of liquid crystal molecules LC aligned on the surface of the upper curved display panel and an average pretilt angle of liquid crystal molecules LC aligned on the surface of the lower curved display panel are substantially the same as an average pretilt angle of liquid crystal molecules LC aligned on the surface of the upper flat display panel and an average pretilt angle of liquid crystal molecules LC aligned on the surface of the lower flat display panel. Each of the apexes is an arbitrary point on a curve, and a tangent line at the point has a slope of substantially zero.

For example, the radius of curvature R of the curved LCD 500C may be 2000 to 5000 millimeters (mm). Here, the average pretilt angle of the liquid crystal molecules LC at each apex is substantially the same as the average pretilt angle of the liquid crystal molecules LC measured in the flat panel LCD.

Figure 14:
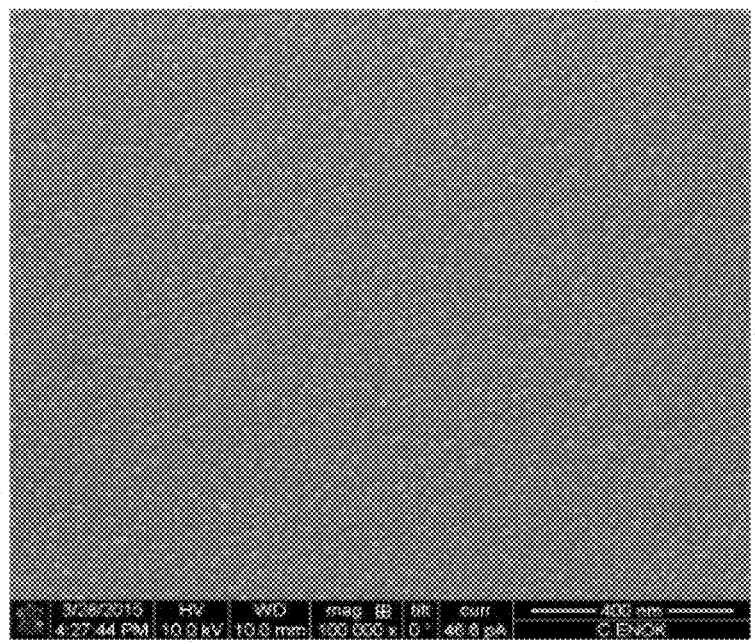
FIG. 14 is a surface image of another embodiment of the first liquid crystal alignment stabilization layer of the LCD in FIG. 5.
Figure 15:
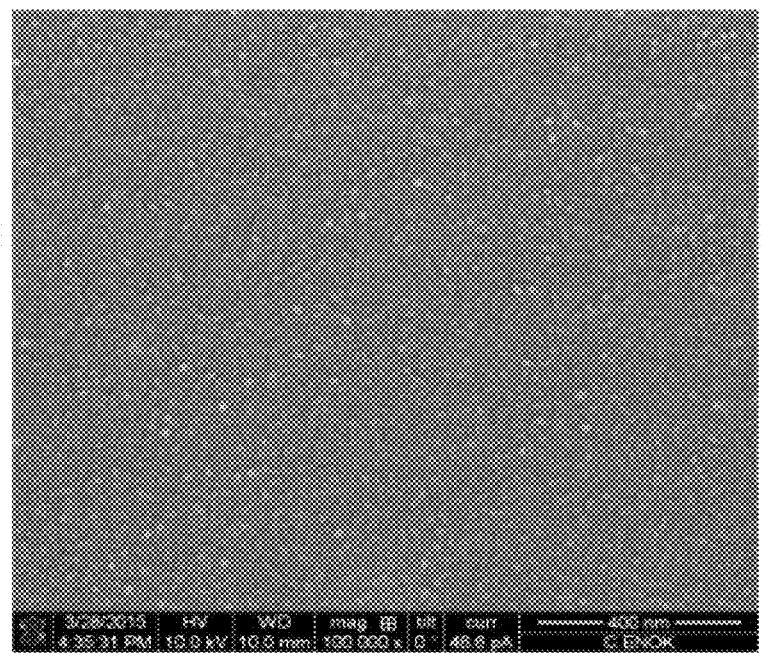
FIG. 15 is a surface image of another embodiment of the second liquid crystal stabilization layer of FIG. 5.
Figure 16:
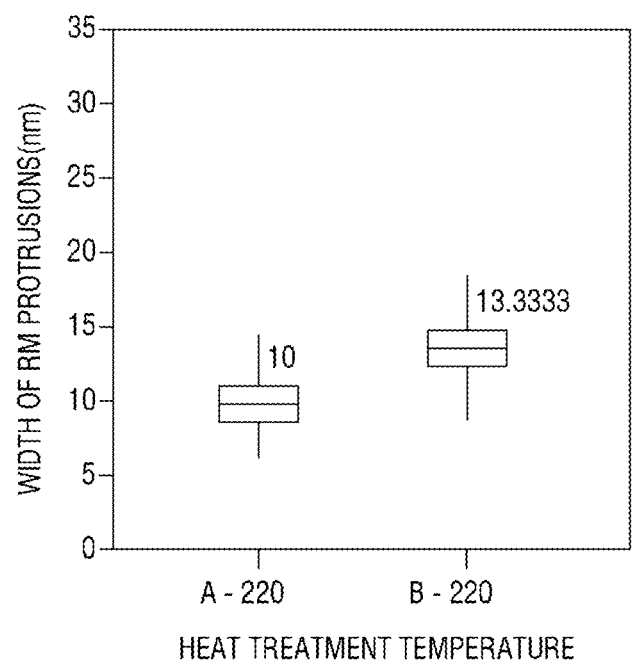
FIG. 16 is a graph illustrating the average size (width) versus heat treatment temperature (° C.) of the first protrusions that form the first liquid crystal alignment stabilization layer and the second protrusions that form the second liquid crystal alignment stabilization layer, for the LCD of FIG. 5.

FIG. 14 is a surface image of an exemplary embodiment of the first liquid crystal alignment stabilization layer AL1-2 of the flat LCD in FIG. 5. FIG. 15 is a surface image an exemplary embodiment of the second liquid crystal stabilization layer AL2-2 of the flat LCD of FIG. 5. FIG. 16 is a graph illustrating the average size (width) versus heat treatment temperature of the first protrusions that form the first liquid crystal alignment stabilization layer and the average size of the second protrusions that form the second liquid crystal alignment stabilization layer AL2-2, for the LCD of FIG. 5 according to another embodiment of the present invention.

Referring to FIGS. 1, 3, and 14 through 16, when the first coating layer AL1-1 is heat-treated at a temperature of 220° C. and when the second coating layer AL2-1 is heat-treated at a temperature of 200° C., the average size (A-220° C.) of the first protrusions is smaller than the average size (B-200° C.) of the second protrusions.

That is, the first liquid crystal molecules aligned on the surface of the first liquid crystal alignment stabilization layer AL1-2 and the second liquid crystal molecules aligned on the surface of the second liquid crystal alignment stabilization layer AL2-2 can be made to have different pretilt angles by forming the first vertical liquid crystal alignment agent and the second vertical liquid crystal alignment agent using heterogeneous compounds, forming the first reactive mesogens RM1 and the second reactive mesogens RM2 using heterogeneous compounds, and employing different heat-treatment temperatures.

Embodiments of the present invention provide at least one of the following advantages.

The present invention can provide an LCD having improved light transmittance by designing a pretilt angle of liquid crystal molecules aligned on a surface of an upper display panel and a pretilt angle of liquid crystal molecules aligned on a surface of a lower display panel to be different from each other.

The present invention can provide a method of manufacturing an LCD, which is applicable to both a curved LCD and a flat panel LCD, by forming an upper liquid crystal alignment layer and a lower liquid crystal alignment layer using heterogeneous liquid crystal alignment agents that include heterogeneous reactive mesogens.

However, the effects of the present invention are not restricted to the embodiments set forth herein. The above and other effects of the present invention will become more apparent to one of skill in the art to which the present invention pertains by referencing the claims.

What is claimed is:

1. A liquid crystal display (LCD) comprising:
a thin-film transistor (TFT) array substrate;
a counter substrate facing the TFT array substrate;
a liquid crystal layer comprising liquid crystal molecules having negative dielectric anisotropy and disposed between the TFT array substrate and the counter substrate;
a first liquid crystal alignment base layer disposed between the liquid crystal layer and the counter substrate and comprising a first compound;
a first liquid crystal alignment stabilization layer comprising first protrusions comprising first polymers of reactive mesogens disposed on a surface of the first liquid crystal alignment base layer, wherein the first protrusions are separated from each other;
a second liquid crystal alignment base layer disposed between the liquid crystal layer and the TFT array substrate and comprising a second compound different from the first compound; and
a second liquid crystal alignment stabilization layer comprising second protrusions comprising second polymers of reactive mesogens and disposed on a surface of the second liquid crystal alignment base layer,
wherein the second protrusions do not comprise the first polymers of reactive mesogens, and the second polymers of reactive mesogens are different from the first polymers of reactive mesogens, and
wherein the first liquid crystal alignment base layer further comprises a radical collector and a concentration of the radical collector is relatively higher in the first liquid crystal alignment base layer than in the second liquid crystal alignment base layer, wherein the radical collector is one or more of $C_1$-$C_{10}$ alkylamine, arylamine, heterocyclic amine, furan, and thiophene.

2. The LCD of claim 1, wherein the liquid crystal molecules comprise first liquid crystal molecules aligned on a surface of the first liquid crystal alignment stabilization layer and second liquid crystal molecules aligned on a surface of the second liquid crystal alignment stabilization layer, and wherein an average pretilt of the first liquid crystal molecules is greater than an average pretilt of the second liquid crystal molecules.

3. The LCD of claim 2, wherein a difference between the average pretilt angle of the first liquid crystal molecules aligned on the surface of the first liquid crystal alignment stabilization layer and the average pretilt angle of the second liquid crystal molecules aligned on the surface of the second liquid crystal alignment stabilization layer is in a range of about 0.7 to about 1.2.

4. The LCD of claim 1, wherein the second liquid crystal alignment base layer further comprises a polymerization initiator or a decomposed product of the polymerization initiator, and a concentration of the polymerization initiator or the decomposed product of the polymerization initiator is relatively higher in the second liquid crystal alignment base layer than in the first liquid crystal alignment base layer.

5. The LCD of claim 1, wherein the second protrusions are separated from each other and have a larger size than the first protrusions.

6. The LCD of claim 1, further comprising:
a patternless electrode disposed between the counter substrate and the first liquid crystal alignment base layer and does not have a domain partition means; and
a patterned electrode disposed between the TFT array substrate and the second liquid crystal alignment base layer and has a domain partition means.

7. The LCD of claim 1, wherein a surface of the LCD facing a viewer is concave from the viewer's perspective.

8. An LCD comprising:
a thin film transistor (TFT) array substrate;
a counter substrate facing the TFT array substrate;
a liquid crystal layer comprising liquid crystal molecules having negative dielectric anisotropy and disposed between the TFT array substrate and the counter substrate;
a first liquid crystal alignment base layer disposed between the liquid crystal layer and the counter substrate and comprising a first compound;
a first liquid crystal alignment stabilization layer comprising first protrusions comprising a first polymer of reactive mesogens and disposed on a surface of the first liquid crystal alignment base layer, wherein the first protrusions are separated from each other;
a second liquid crystal alignment base layer disposed between the liquid crystal layer and the TFT array substrate and comprising a second compound different from the first compound; and
a second liquid crystal alignment stabilization layer comprising second protrusions comprising a second polymer of reactive mesogens and disposed on a surface of the second liquid crystal alignment base layer, wherein the second protrusions are separated from each other and have a smaller size than the first protrusions, and
wherein the first liquid crystal alignment base layer further comprises a radical collector and a concentration of the radical collector is relatively higher in the first liquid crystal alignment base layer than in the second liquid crystal alignment base layer, wherein the radical collector is one or more of $C_1$-$C_{10}$ alkylamine, arylamine, heterocyclic amine, furan, and thiophene.

9. The LCD of claim 8, wherein the liquid crystal molecules comprise first liquid crystal molecules aligned on a surface of the first liquid crystal alignment stabilization layer and second liquid crystal molecules aligned on a surface of the second liquid crystal alignment stabilization layer, and wherein an average pretilt angle of the first liquid crystal molecules is smaller than an average pretilt angle of the second liquid crystal molecules.

10. The LCD of claim 8, wherein the second liquid crystal alignment base layer further comprises a polymerization initiator or a decomposed product of the polymerization initiator and a concentration of the polymerization initiator or the decomposed product of the polymerization initiator is relatively higher in the second liquid crystal alignment base layer than in the first liquid crystal alignment base layer.

11. The LCD of claim 8, further comprising:
a patternless electrode disposed between the counter substrate and the first liquid crystal alignment base layer and does not have a domain partition means; and
a patterned electrode disposed between the TFT array substrate and the second liquid crystal alignment base layer and has a domain partition means.

12. A method of manufacturing an LCD, the method comprising:
forming a first coating layer by forming a patternless electrode which does not have a domain partition means on a counter substrate facing a thin film transistor (TFT) array substrate and coating a first liquid crystal vertical alignment agent comprising first reactive mesogens on the patternless electrode;
forming a second coating layer by forming a patterned electrode comprising a domain partition means on the TFT array substrate and coating a second liquid crystal vertical alignment agent comprising polymerization initiators and second reactive mesogens on the patterned electrode, wherein the second liquid crystal vertical alignment agent does not comprise the first reactive mesogens, and the second reactive mesogens are different from the first reactive mesogens;
manufacturing an LCD panel by forming a liquid crystal layer between the TFT array substrate and the counter substrate and bonding the TFT array substrate and the counter substrate together, wherein the liquid crystal layer comprises a liquid crystal composition comprising liquid crystal molecules;
forming a first liquid crystal alignment base layer on the patternless electrode and a second liquid crystal alignment base layer on the patterned electrode by heat-treating the LCD panel; and
forming a first liquid crystal alignment stabilization layer and a second liquid crystal alignment layer by irradiating ultraviolet light onto the LCD panel,
wherein the first liquid crystal alignment stabilization layer comprises first protrusions comprising first polymers of the first reactive mesogens disposed on the first liquid crystal alignment base layer, wherein the first protrusions are separated from each other, and
wherein the second liquid crystal alignment stabilization layer comprises second protrusions comprising the second polymers of the second reactive mesogens disposed on the second liquid crystal alignment base layer, wherein the second protrusions are separated from each other, wherein the first liquid crystal alignment base layer further comprises a radical collector and a concentration of the radical collector is relatively higher in the first liquid crystal alignment base layer than in the second liquid crystal alignment base layer, wherein the radical collector is one or more of $C_1$-$C_{10}$ alkylamine, arylamine, heterocyclic amine, furan, and thiophene.

13. The method of claim 12, further comprising bending both ends of the LCD panel.

14. The method of claim 12, wherein in the heat-treating of the LCD panel, a heat-treatment temperature of the first coating layer is the same as a heat-treatment temperature of the second coating layer, each of the heat-treatment temperature of the first coating layer and the heat-treatment temperature of the second coating layer is in a range of about 200° C. to less than about 230° C., and the second protrusions have a larger average size than the first protrusions.

15. The method of claim 12, wherein in the heat-treating of the LCD panel, the heat-treatment temperature of the first coating layer is higher than the heat-treatment temperature of the second coating layer, each of the heat-treatment temperature of the first coating layer and the heat-treatment temperature of the second coating layer is in a range of about 200° C. to less than about 230° C., and the first protrusions have a larger average size than the second protrusions.

\* \* \* \* \*